Dec. 26, 1950     W. ECONOMOUS     2,535,398
BOLT POINTER
Filed April 20, 1946
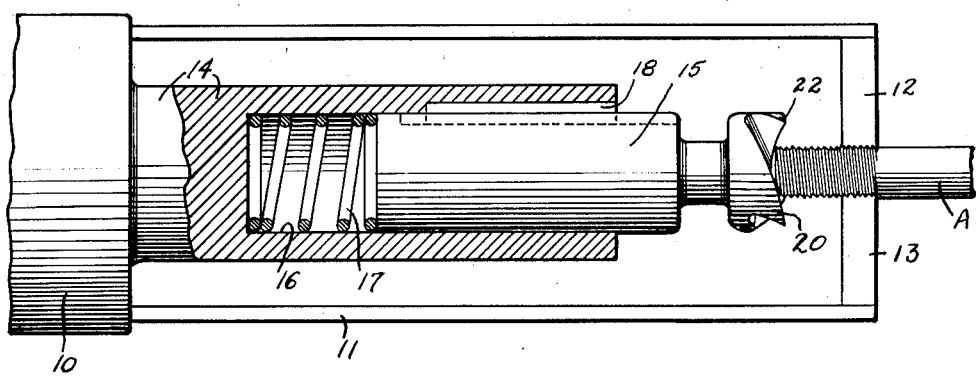
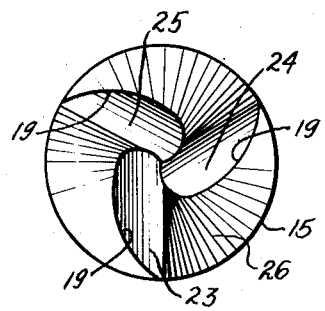
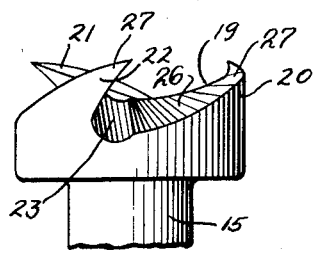
Inventor
WILLIAM ECONOMOUS Patented Dec. 26, 1950

2,535,398

UNITED STATES PATENT OFFICE 2,535,398

BOLT POINTER

William Economous, Chicago, Ill., assignor of one-fourth to Lee M. Reibstein and one-fourth to Harvey W. Rupnow, both of Chicago, Ill.

Application April 20, 1946, Serial No. 663,650

2 Claims. (Cl. 29—103)

The present invention relates to a bolt pointer and more particularly to a tool, for pointing bolts, having a novel blade construction.

Tools for pointing the ends of bolts are old. In the main, such a tool comprises a flat plate having an arcuate or evenly formed curved cutting edge which plate when rotated with respect to a bolt, shapes its end. However, such a pointer has not proved completely satisfactory as the ends of the threads are not clean and sometimes the threads at the tip are displaced and burrs are left, requiring extra work to condition the bolts for sale thereby adding to the cost of manufacture.

The present invention has to do with a pointing tool for the ends of bolts which may be used with thread cutting dies so that a bolt may be threaded and its ends or tips pointed without removing or changing the position of the bolt blank. The tool of the present invention points bolts cleanly and without leaving burrs or any other unevennesses.

An object of the present invention is to provide a bolt pointing tool having novel cutting blade arrangement.

Another object of the present invention is to provide a bolt pointing tool having chip removal means at the bases of the cutting blades.

A further object of the present invention is to provide a bolt pointing tool having curved, forward leading cutting edges to initially engage the outer periphery of the bolt and cut in a shearing manner toward the axis of the bolt.

The above, other and further objects of the present invention will be apparent from the following description and accompanying drawing.

Figure 1 is a fragmental schematic view of a bolt threading and pointing arrangement utilizing the pointing tool of the present invention;

Figure 2 is an end view of the tool; and

Figure 3 is an elevation of the tool showing the blades.

As shown on the drawing:

The numeral 10 designates the rotatable head of a bolt threading machine to which is attached a cutting head 11 having cooperating threading dies 12 and 13 arranged as shown and which may be moved against and away from a bolt blank A by suitable means. Also attached to the head 10 to rotate with it is a sleeve 14 having a pointing tool 15 arranged in the bore 16 of the sleeve with a spring 17 acting against the inward end of the tool to urge it to the right, as shown in Figure 1. A key 18 is provided to prevent relative rotation between the tool 15 and the sleeve 14 and also to limit the outward projection of the tool 15 by the spring 17.

Referring to Figures 2 and 3, it will be noted that the cylindrical cutter has three identical blades 20, 21 and 22. The cutting edges 19 curve from the axis of the tool in the cutting direction, the curve of each edge having a radius that progressively increases as the curve proceeds radially as illustrated in Figure 2. As shown in Figure 3, the points on the curve of each edge project further forward axially as they approach the periphery of the cutter. The face of the cutter slopes backwardly from both sides of each of the edges 19 into grooves 23, 24 and 25 which receive the cuttings or chips from the blades 22, 20 and 21 respectively and direct them to the periphery of the cutter. The face of the cutter between a groove and the edge of the blade next ahead forms a land portion 26. The grooves are disposed backwardly, in a direction opposite the cutting direction, from the corresponding edges to form sharp cutting edges particularly at the leading peripheral ends 27 of the blades.

It will also be observed that the contour of the curve defined by the cutting edges of two adjacent blades is uniform from tip to tip so that the end of a bolt will be pointed uniformly, regardless of diameter up to a maximum diameter equal to or substantially equal to the distance between the points of the blade. In this wise the tool may be used for pointing the tip ends of bolts of various sizes with assurance that the tips will all be uniform.

It will be observed that the leading and curved contour of the cutting edges results in the initial engagement of the sharp outer portion of the edges with the peripheral edge of the bolt to be pointed and a cutting action directed in a shearing manner toward the axis of the bolt. This prevents the formation of burrs on the periphery of the bolt, leaves the threads clean so that the bolt will readily enter the threaded part and eliminates the extra labor sometimes involved when burrs are formed and the bolts are not cleanly or evenly pointed.

The bolt blank A is held in a suitable jig in fixed and immovable position and the jig is movable to advance the blank between the threading dies 12 and 13 and against the pointer. The spring 17 permits the pointing tool 15 to move with the blank, while pointing the blank, so that threading and pointing may be simultaneous.

It will, of course, be understood that various details of construction may be varied without departing from the principles of this invention, and it is, therefore, not the purpose to limit the patent granted hereon otherwise than necessitated by the scope of the appended claims.

I claim as my invention:

1. A pointing tool for bolts and the like, comprising a cylindrical cutter having an end face formed with a plurality of identically shaped cutting blades, each having a cutting edge extending radially from the axis of said end face to the periphery of said end face and curving in a cutting direction, the points on each curve projecting progressively further forward axially as said points approach said periphery, said end face sloping away from each end axially rearwardly on either side thereof into axially extending grooves for the escape of cuttings.

2. A pointing tool for bolts and the like, comprising a cylindrical cutter having a solid end face formed with a plurality of identically shaped blades each having a cutting edge smoothly curved in a cutting direction from the axis of said end face to the periphery thereof, the curve of each edge having a radius that progressively increases as the curve proceeds radially outwardly and the points on each curve projecting progressively further forward axially as said points approach said periphery, said end face sloping away from each end axially rearwardly thereof on either side thereof to form sharp leading points at the periphery of the ends of said blades and relieving grooves between said blades for the escape of cuttings.

WILLIAM ECONOMOUS.

REFERENCES CITED

The following references are of record in the file of this patent:

UNITED STATES PATENTS

| Number | Name | Date |
|---|---|---|
| 144,569 | Schermerhorn | Nov. 11, 1873 |
| 217,183 | Wenchel | July 1, 1879 |
| 598,364 | Dalzell | Feb. 1, 1898 |
| 1,214,244 | Waltz | Jan. 30, 1917 |
| 1,472,960 | Conklin | Nov. 6, 1923 |
| 1,514,709 | Lyon | Nov. 11, 1924 |
| 1,625,836 | Tanguay | Apr. 26, 1927 |
| 1,713,076 | Englund | May 14, 1929 |
| 2,129,418 | Case | Sept. 6, 1938 |
| 2,241,703 | Gommel | May 13, 1941 |
| 2,292,581 | Richardson | Aug. 11, 1942 |
| 2,337,797 | Brackett | Dec. 28, 1943 |
| 2,381,540 | Horth | Aug. 7, 1945 |

FOREIGN PATENTS

| Number | Country | Date |
|---|---|---|
| 3,657 | Great Britain | Feb. 14, 1911 |
| 6,571 | Great Britain | Mar. 17, 1913 |
| 463,503 | Germany | Aug. 13, 1928 |
| 499,733 | France | Nov. 27, 1919 |